US006604280B2

(12) United States Patent
Carlotto

(10) Patent No.: US 6,604,280 B2
(45) Date of Patent: Aug. 12, 2003

(54) DEVICE FOR ADJUSTING THE CLAMPING PRESSURE IN APPLICATORS FOR CLAMPING TERMINALS ONTO ELECTRICAL CABLES

(75) Inventor: Vladimiro Carlotto, Vigodarzere (IT)

(73) Assignee: K.M.I. S.r.l., San Giorgio Delle Pertiche (IT)

(*) Notice: Subject to any disclaimer, the term of this patent is extended or adjusted under 35 U.S.C. 154(b) by 0 days.

(21) Appl. No.: 09/887,030

(22) Filed: Jun. 25, 2001

(65) Prior Publication Data

US 2002/0000035 A1 Jan. 3, 2002

(30) Foreign Application Priority Data

Jun. 30, 2000 (IT) ..................................... PD2000A0175

(51) Int. Cl.[7] ....................... B23P 19/00; H01R 43/042; B21C 51/00; B21D 37/10

(52) U.S. Cl. ............................. 29/747; 29/748; 29/751; 29/862; 72/31.1; 72/416

(58) Field of Search .......................... 29/748, 747, 751, 29/753, 755, 861, 862, 863, 33 F, 33 M, 761, 857; 72/31.1, 31.11, 416, 448

(56) References Cited

U.S. PATENT DOCUMENTS

| | | | | |
|---|---|---|---|---|
| 4,790,173 A | * | 12/1988 | Boutcher, Jr. | 100/257 |
| 5,095,599 A | * | 3/1992 | Gloe et al. | 29/33 M |
| 5,289,713 A | * | 3/1994 | Schafer | 100/257 |
| 5,947,407 A | * | 9/1999 | Quigley | 242/559 |
| 6,026,562 A | * | 2/2000 | McMillin et al. | 29/33 M |

* cited by examiner

*Primary Examiner*—Carl J. Arbes
*Assistant Examiner*—Tim Phan
(74) *Attorney, Agent, or Firm*—Guido Modiano; Albert Josif; Daniel O'Byrne

(57) ABSTRACT

A device for adjusting the clamping pressure in applicators for clamping terminals onto electrical cables comprising a composite pivot interposed between an actuation hammer and a supporting element to which the tools for clamping the terminal respectively onto the insulation and onto the core of the conductor are slidingly coupled in a mutually parallel arrangement; the thrust of the hammer acts on the heads of the tools, and the pivot is rigidly coupled to the hammer or to the supporting element. The pivot has coaxial threaded regions on which respective wheels are engaged. Screwing/unscrewing of the wheels varies axial distance, with respect to the hammer, of either the tools or only of the insulation clamping tool.

20 Claims, 2 Drawing Sheets

DEVICE FOR ADJUSTING THE CLAMPING PRESSURE IN APPLICATORS FOR CLAMPING TERMINALS ONTO ELECTRICAL CABLES

BACKGROUND OF THE INVENTION

The present invention relates to a device for adjusting the clamping pressure in applicators for clamping terminals onto electrical cables.

Applicators for clamping terminals to the stripped ends of electrical cables are already known.

The different diameter of the cables regarding both the part related to the inner copper core and the part related to the external insulating sheath makes it necessary to adjust the clamping of terminals to the sheath and to the copper.

SUMMARY OF THE INVENTION

The aim of the present invention is to provide a device which can finely adjust the clamping pressure separately for the copper core and for the external insulating sheath of electrical cables in applicators for clamping terminals.

Within this aim, a consequent primary object is to provide a device which allows immediate identification of the adjustment positions.

Another object is to provide an adjustment device which maintains over time every position that is set.

This aim and these and other objects which will become better apparent hereinafter are achieved by a device for adjusting the clamping pressure in applicators for clamping terminals onto electrical cables, characterized in that it comprises a composite pivot being interposed between an actuation hammer and a supporting element to which the tools for clamping a terminal respectively onto the insulation and onto the core of a conductor are rigidly coupled in a parallel arrangement, said hammer acting on respective heads by pushing, said pivot being rigidly coupled to any of said hammer and said supporting element, said pivot having coaxial threaded regions on which respective wheels are engaged, a first wheel being engaged on a side of said hammer and a second one of said wheels being engaged on a side of said supporting element, said second wheel acting only on the insulation clamping tool, screwing and/or unscrewing of said wheel on the respective threaded regions varying the axial distance, with respect to said hammer, of both tools in the case of the first wheel and only of the insulation clamping tool in the case of the second wheel.

BRIEF DESCRIPTION OF THE DRAWINGS

Further characteristics and advantages of the invention will become better apparent from the detailed description of an embodiment thereof, illustrated only by way of non-limitative example in the accompanying drawings, wherein.

DESCRIPTION OF THE PREFERRED EMBODIMENTS

Figure 1:
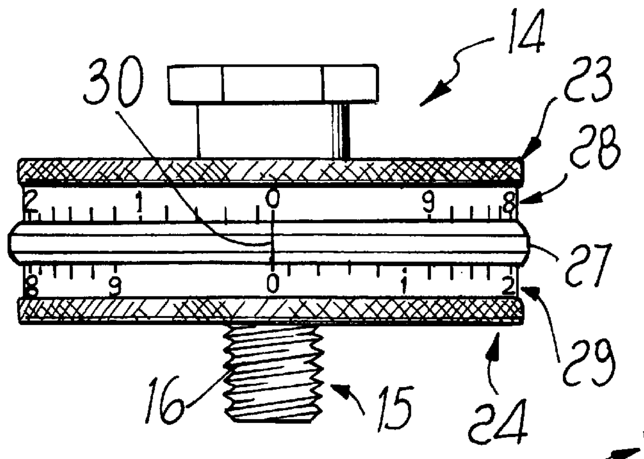
FIG. 1 is a side view of a device according to the invention.
Figure 3:
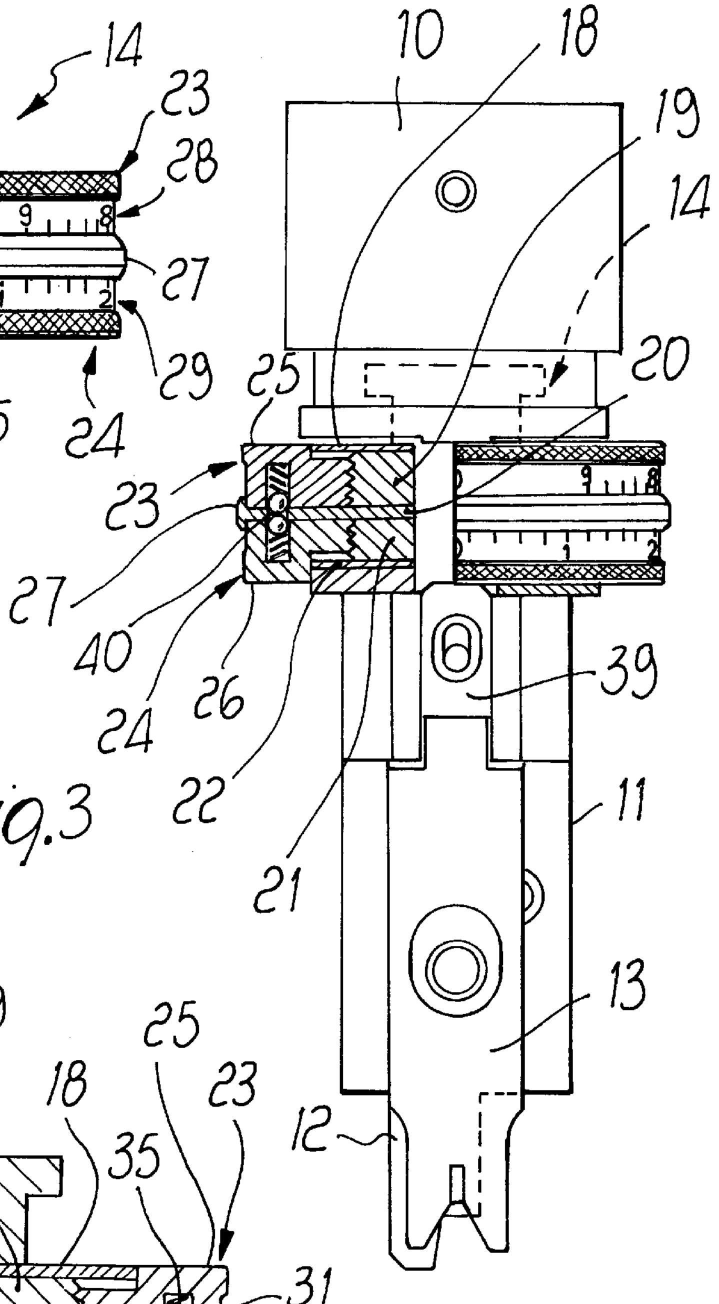
FIG. 3 is a partially sectional front view of the device of FIG. 1, shown assembled together with the other machine parts that it adjusts.
Figure 2:
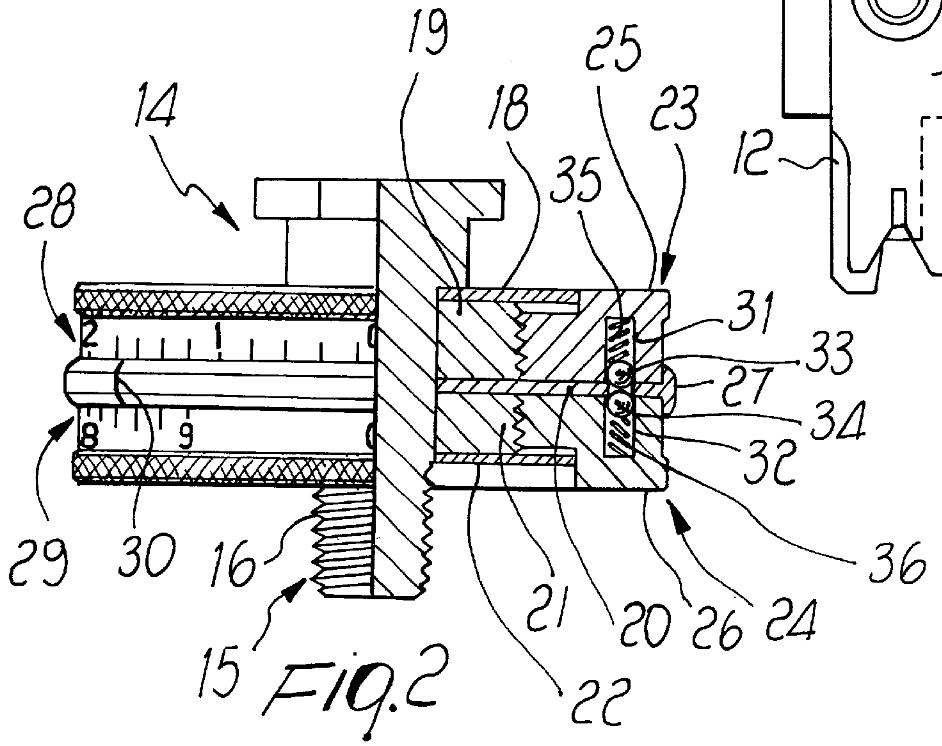
FIG. 2 is a partially sectional side view of the device of FIG. 1.
Figure 4:
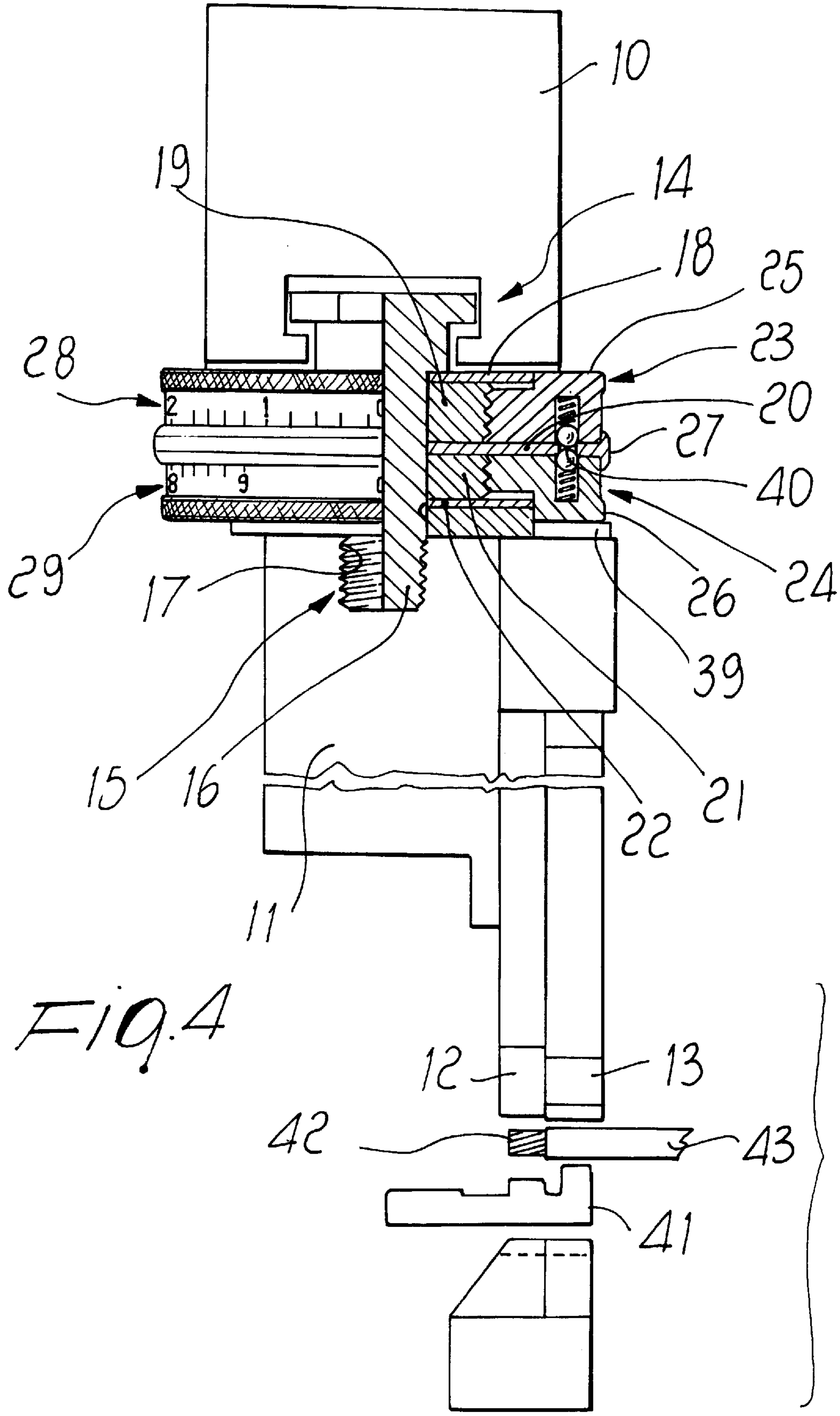
FIG. 4 is a partially sectional side view of the device of FIG. 1 and of the related machine parts.

With reference to the figures, a device according to the invention comprises a composite pivot, generally designated by the reference numeral 14, being interposed between an actuation hammer 10 and a supporting element 11 to which the pivot is rigidly coupled in this case; the supporting element in practice is constituted by a tool supporting slider to which the tools for clamping the terminal 41, respectively the tool 12 for clamping on the conductor 42 and the tool 13 for clamping on the insulation 43 (FIG. 4), are slidingly coupled in a parallel arrangement; the thrust of the hammer 10 is applied to the heads of the tools.

More particularly, said composite pivot 14 comprises a screw element 15, in which the stem 16 is screwed into a complementarily threaded hole 17 of the element 11 and the head packs in succession a first washer 18, a first spacer ring 19 with a threaded outer region, a positioning disk 20, a second spacer ring 21 with a threaded outer region, and a second washer 22.

A first wheel 23 is screwed onto the first spacer ring 19 and a second wheel 24 is screwed onto the second spacer ring 21.

The size ratios are such that the first wheel 23 protrudes axially with a perimetric edge 25 from the first washer 18, the second wheel 24 protrudes axially with a perimetric edge 26 from the second washer 22, and both wheels 23 and 24 are contained radially between a wider edge 27 of the positioning disk 20 and the respective rings 19 and 21.

The wheels 23 and 24 are graduated on their outer bands with respective scales 28 and 29 which cooperate with a reference 30 cut into the wider edge 27 of the positioning disk 20.

Advantageously, the threads of the first and second spacer rings 19 and 21 have such pitches that each wheel 23 and 24 moves axially by one millimeter for each complete turn.

The scales 28 and 29 are provided so as to produce a minimum range of two hundredths of a millimeter.

Each wheel 23 and 24 has axial dead holes, designated respectively by the reference numerals 31 and 32, which accommodate corresponding balls 33 and 34 which are pushed by respective springs 35 and 36 being interposed between said balls and the bottoms.

The balls 33 and 34 rest on the disk 20, which has a plurality of through holes 40 having a smaller diameter so as to define seats in which said balls can find stable positions.

The holes 40 are arranged so that their distance corresponds to an axial variation of two hundredths of a millimeter (and therefore corresponds to the distance between two notches of the scales 28 and 29).

As shown in the figures, the edge of the first wheel 25 is adapted to rest directly against the hammer 10, while the edge 26 of the second wheel 24 rests on a movable element 39 which is interposed between it and the tool 13 for clamping the insulation 43.

As regards operation, the screw element 15 packs and fixes to the supporting element 11 the washers 18 and 22, the rings 19 and 21, and the positioning disk 20.

By turning the wheels 23 and 24 one obtains, for the first wheel, a variation in the stroke limit point of the hammer 10, and therefore of the element 11 to which the tool 12 for clamping the conductor 42 is rigidly coupled, and, for the second wheel, a variation in the possible stroke exclusively of the tool 13 for clamping the insulation 43.

Therefore, with the above described device a fine adjustment of the clamping pressure and immediate visibility of the reference system by way of the scales 28 and 29 cut into the wheels 23 and 24, is obtained.

In practice it has been found that the intended aim and objects of the present invention have been achieved.

In practice, the materials used, so long as they are compatible with the contingent use, as well as the dimensions, may be any according to requirements. The disclosures in Italian Patent Application No. PD2000A000175 from which this application claims priority are incorporated herein by reference.

What is claimed is:

1. A device for adjusting the clamping pressure in applicators for clamping terminals onto electrical cables provided with core and insulation, comprising: tools for clamping a terminal onto the insulation and onto the core of a conductor, respectively; an actuation hammer; a supporting element to which said tools are rigidly coupled in a parallel arrangement; a composite pivot comprising a stem bearing a first and second outer, coaxial, threaded regions, said composite pivot being interposed between said hammer and said supporting element, said hammer acting on respective heads of said tools by pushing, said pivot being rigidly coupled to any of said hammer and said supporting element; first and second actuation wheels screwed at said first and second threaded regions, respectively, with the first wheel being engaged on a side of said hammer and the second wheel being engaged on a side of said supporting element, said second wheel acting only on the insulation clamping tool, and wherein said first wheel is actuatable for selectively performing screwing and unscrewing motions on the first threaded region to vary an axial distance of said tools with respect to said hammer, and said second wheel is actuatable for selectively performing screwing and unscrewing motions on the second threaded region for varying an axial distance of only the insulation damping tool.

2. The device of claim 1, wherein said first wheel is screwed onto said first spacer ring and said second wheel is screwed onto the second spacer ring.

3. The device of claim 1, wherein said first wheel is arranged so as to protrude axially with a perimetric edge thereof from said first washer, and said second wheel so as to protrude axially with a perimetric edge thereof from said second washer, both said first and second wheels being contained radially between a wider edge of said positioning disk and said spacer rings.

4. The device of claim 3, wherein said first and second wheels are graduated on outer bands thereof with respective scales, said scales cooperating with a reference mark which is cut into said positioning disk.

5. The device of claim 4, wherein said scales are provided so as to produce a minimum range of two hundredths of a millimeter.

6. The device of claim 4, comprising a movable element which is interposed between said second wheel and said insulation clamping tool, said first wheel being arranged with an edge thereof rested against said hammer, and said second wheel being arranged with an edge thereof rested against said movable element.

7. The device of claim 3, wherein the thread regions of said first and second spacer rings are provided with pitches such that each wheel moves axially by one millimeter for each full turn.

8. The device of claim 3, further comprising: axial dead holes provided at each one of said first and second wheels; corresponding balls accommodated in said dead holes; respective springs which are interposed between said balls and bottoms of said dead holes so as to push out said balls, and a series of positioning holes provided at said positioning disk, said balls resting on said positioning disk, at said series of holes so as to assume selected stable positions.

9. The device of claim 8, wherein said positioning holes are arranged at mutual distances corresponding to an axial distance variation of said tools of two hundredths of a millimeter.

10. The device of claim 1, further comprising a first washer; a first spacer ring; a second spacer ring, said coaxial threaded regions being provided on an external part of said first and second spacer rings; and a second washer, said composite pivot comprising a screw element with a threaded stem and a head, and said supporting element having a hole threaded complementarily to said screw element, said stem being screwed into the complementarily threaded hole of the supporting element, and said head packing in succession said first washer, first spacer ring, positioning disk, second spacer ring and second washer.

11. A device for adjusting the clamping pressure in applicators for clamping terminals onto electrical cables provided with core and insulation, comprising: tools for clamping a terminal onto the insulation and onto the core of a conductor, respectively; an actuation hammer, a supporting element to which said tools are rigidly coupled in a parallel arrangement; a composite pivot which is interposed between said hammer and said supporting element, said hammer acting on respective heads of said tools by pushing, said pivot being rigidly coupled to any of said hammer and said supporting element; coaxial threaded regions provided at said pivot; respective first and second actuation wheels engaged at said threaded regions, with the first wheel being engaged on a side of said hammer and the second wheel being engaged on a side of said supporting element, said second wheel acting only on the insulation clamping tool; a positioning disk arranged between said first and second wheels; axial dead holes provided at each one of said first and second wheels; corresponding balls accommodated in said dead holes; respective springs which are interposed between said balls and bottoms of said dead holes so as to push out said balls, and a series of positioning holes provided at said positioning disk, said balls resting on said positioning disk at said series of holes so as to assume selected stable positions, and said first wheel being movable for screwing and unscrewing motion on a first one of said threaded regions to vary an axial distance of said tools with respect to said hammer, and said second wheel being movable for screwing and unscrewing motion on a second one of said threaded regions for varying an axial distance of only the insulation clamping tool.

12. The device of claim 11, further comprising a first washer; a first spacer ring; a second spacer ring, said coaxial threaded regions being provided on an external part of said first and second spacer rings; and a second washer, said composite pivot comprising a screw element with a treaded stem and a head, and said supporting element having a hole threaded complementarily to said screw element, said stem being screwed into the complementarily threaded hole of the supporting element, and said head packing in succession said first washer, first spacer ring, positioning disk, second spacer ring and second washer.

13. The device of claim 12, wherein said first wheel is screwed onto said first spacer ring and said second wheel is screwed onto the second spacer ring.

14. The device of claim 12, wherein said first wheel is arranged so as to protrude axially with a perimetric edge thereof from said first washer, and said second wheel so as to protrude axially with a perimetric edge thereof from said second washer, both said first and second wheels being contained radially between a wider edge of said positioning disk and said spacer rings.

15. The device of claim 14, wherein said first and second wheels are graduated on outer bands thereof with respective scales, said scales cooperating with a reference mark which is cut into said positioning disk.

16. The device of claim 15, wherein said scales are provided so as to produce a minimum range of two hundredths of a millimeter.

17. The device of claim 15, comprising a movable element which is interposed between said second wheel and said insulation clamping tool, said first wheel being arranged with an edge thereof rested against said hammer, and said second wheel being arranged with an edge thereof rested against said movable element.

18. The device of claim 14, wherein the thread regions of said first and second spacer rings are provided with pitches such that each wheel moves axially by one millimeter for each full turn.

19. The device of claim 11, wherein said positioning holes are arranged at mutual distances corresponding to an axial distance variation of said tools of two hundredths of a millimeter.

20. A device for adjusting the clamping pressure in applicators for clamping terminals onto electrical cables provided with core and insulation, comprising: tools for clamping a terminal onto the insulation and onto the core of a conductor, respectively; an actuation hammer; a supporting element to which said tools are rigidly coupled in a parallel arrangement; a composite pivot comprising a stem bearing a first and second outer, coaxial, threaded regions, said composite pivot being interposed between said hammer and said supporting element, said hammer acting on respective heads of said tools by pushing, said pivot being rigidly coupled to any of said hammer and said supporting element; first and second actuation wheels screwed at said first and second_threaded regions, respectively, with the first wheel being engaged on a side of said hammer and the second wheel being engaged on a side of said supporting element, said second wheel acting only on the insulation clamping tool; a positioning disk arranged between said first and second wheels; axial dead holes provided at each one of said first and second wheels; corresponding balls accommodated in said dead holes; respective springs which are interposed between said balls and bottoms of said dead holes so as to push out said balls, and a series of positioning holes provided at said positioning disk, said balls resting on said positioning disk, at said series of holes so as to assume selected stable positions and wherein said first wheel is actuatable for selectively performing screwing and unscrewing motions on the first threaded region to vary an axial distance of said tools with respect to said hammer, and said second wheel is actuatable for selectively performing screwing and unscrewing motions on the second threaded region for varying an axial distance of only the insulation clamping tool.

* * * * *